(12) United States Patent
Andre

(10) Patent No.: US 8,944,438 B2
(45) Date of Patent: Feb. 3, 2015

(54) FLUID-ACTUATED WORKHOLDER WITH A COLLET DRIVEN BY A SOFT AND THIN BLADDER

(75) Inventor: William M. Andre, Ortonville, MI (US)

(73) Assignee: Hydra-Lock Corporation, Mt. Clemens, MI (US)

( * ) Notice: Subject to any disclaimer, the term of this patent is extended or adjusted under 35 U.S.C. 154(b) by 1527 days.

(21) Appl. No.: 12/416,343

(22) Filed: Apr. 1, 2009

(65) Prior Publication Data

US 2010/0253015 A1 Oct. 7, 2010

(51) Int. Cl.
*B23B 31/30* (2006.01)
*B23B 31/40* (2006.01)
*B23B 31/20* (2006.01)

(52) U.S. Cl.
CPC ............ *B23B 31/402* (2013.01); *B23B 31/204* (2013.01); *B23B 31/305* (2013.01); *B23B 2226/63* (2013.01); *B23B 2260/042* (2013.01)
USPC ........................................ 279/2.08; 279/4.03

(58) Field of Classification Search
CPC .. B23B 31/1176; B23B 31/30; B23B 31/305; B23B 31/402; B23B 31/204; B23B 2226/63
USPC ........... 279/2.02, 2.06, 2.07, 2.08, 2.09, 4.03, 279/4.05, 4.04, 4.06, 4.07, 139
See application file for complete search history.

(56) References Cited

U.S. PATENT DOCUMENTS

| | | | | |
|---|---|---|---|---|
| 3,542,354 A | * | 11/1970 | Fitzpatrick | 269/22 |
| 3,677,559 A | * | 7/1972 | Andre et al. | 279/4.03 |
| 3,679,219 A | * | 7/1972 | Cameron | 279/4.03 |
| 4,317,577 A | * | 3/1982 | Cameron | 279/2.07 |
| 4,958,969 A | * | 9/1990 | Och | 409/234 |
| 4,979,853 A | * | 12/1990 | Field | 409/136 |
| 5,516,243 A | * | 5/1996 | Laube | 408/239 R |
| 5,711,538 A | * | 1/1998 | Retzbach et al. | 279/2.08 |
| 6,015,154 A | * | 1/2000 | Andre et al. | 279/2.07 |
| 6,077,003 A | * | 6/2000 | Laube | 409/234 |
| 7,147,232 B2 | | 12/2006 | Andre, Sr. | |
| 7,316,403 B2 | | 1/2008 | Andre et al. | |
| 7,331,583 B1 | | 2/2008 | Andre | |
| 7,374,178 B2 | | 5/2008 | Andre et al. | |
| 7,469,907 B2 | | 12/2008 | Laube et al. | |
| 2008/0116649 A1 | | 5/2008 | Andre | |

* cited by examiner

*Primary Examiner* — Eric A Gates
*Assistant Examiner* — Paul M Janeski
(74) *Attorney, Agent, or Firm* — Reising Ethington P.C.

(57) ABSTRACT

A workholder to hold a workpiece, including a main body partially defining a fluid chamber, and a bladder carried by the main body with an interference fit, further defining the fluid chamber, and composed of an 80 to 100 durometer Shore A scale hardness polymer of a 12:1 to 18:1 diameter-to-wall-thickness ratio. Annular seals may further define the fluid chamber, and are disposed radially between the bladder and main body and axially adjacent the fluid chamber, and are composed of a 60 to 80 durometer Shore A scale hardness polymer. A collet is carried and driven by the bladder for gripping engagement with the workpiece.

20 Claims, 2 Drawing Sheets

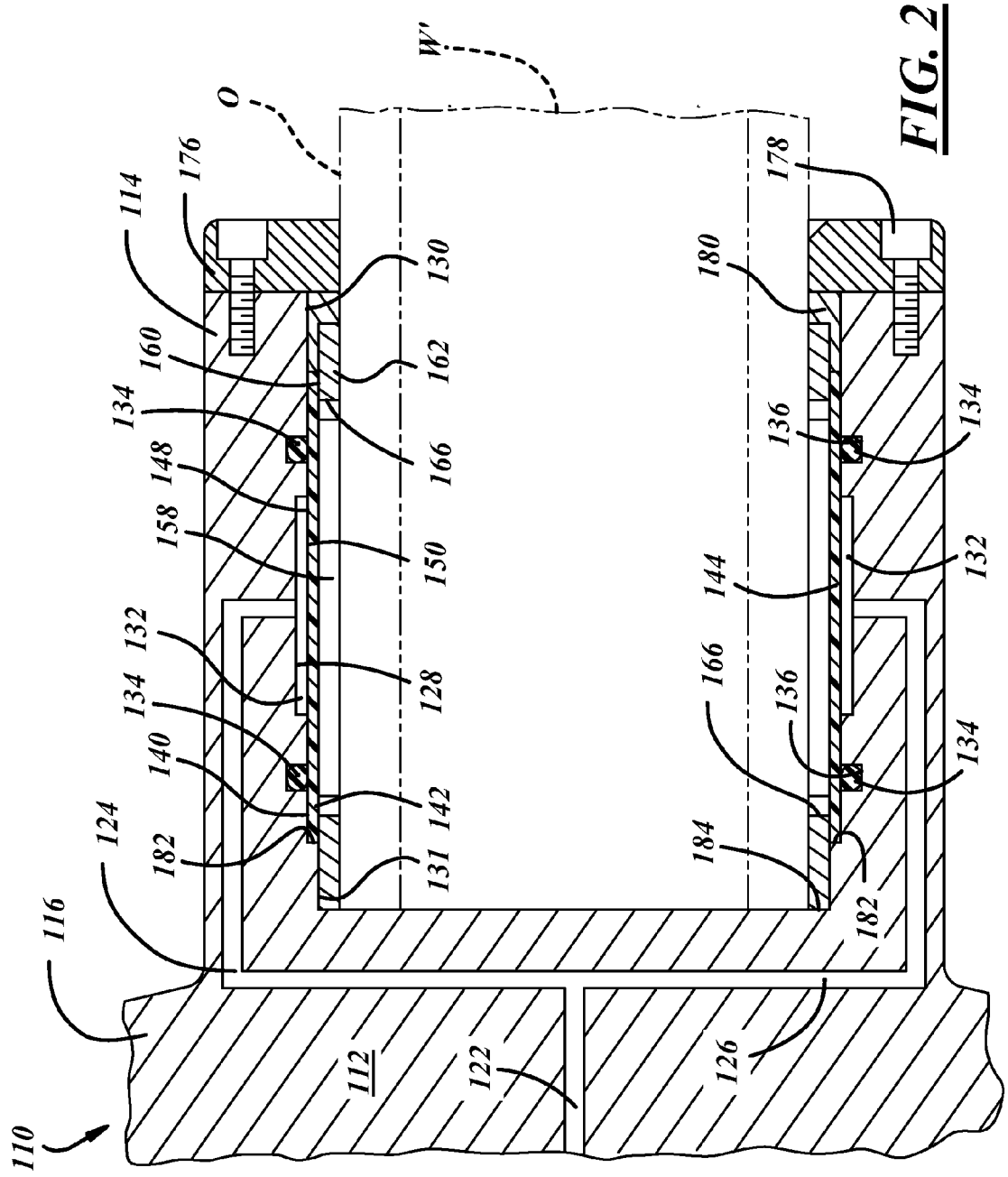

FLUID-ACTUATED WORKHOLDER WITH A COLLET DRIVEN BY A SOFT AND THIN BLADDER

FIELD OF THE INVENTION

The present invention relates to work holders and, more specifically, to a fluid-actuated work holder having a bladder-driven collet.

BACKGROUND OF THE INVENTION

Workpiece holders, or workholders, have been used for decades and are useful for holding solid and annular workpieces for subsequent machining or grinding. A first type of hydraulic workholder includes a main body, a circumferentially continuous steel sleeve carried on the body to grip a workpiece, and a hydraulic fluid chamber defined between the body and sleeve and sealed by rubber O-rings therebetween. A second type of hydraulic workholder includes a main body, a slotted steel sleeve or collet carried by the main body, a relatively hard (85 durometer Shore D scale) plastic bladder carried between the main body and the collet, and a hydraulic fluid chamber defined between the body and bladder and sealed by soft (70 durometer Shore A scale hardness) rubber O-rings therebetween.

With both workholder types, hydraulic fluid in the chamber is pressurized to radially displace the sleeve into gripping engagement with a workpiece. For example, to achieve 0.001" expansion of a typical one-inch diameter sleeve the first type requires application of about 6,000 PSI and the second type requires about 200 PSI of fluid pressure. And, to achieve 0.020" expansion with the second type requires about 2,000 PSI of fluid pressure. In extreme operating environments, such high pressures require concomitant energy consumption, may result in workholder leakage, and/or may cause the hard plastic bladder to extrude through slots in the collet, thereby permanently damaging the workholder.

One recent approach to avoid such high pressure damage includes using a thin metal baffle interposed between the bladder and the collet to prevent the bladder from being extruded through the collet. Even though this approach is a relatively low cost solution, it does not eliminate the high pressure conditions.

Another recent solution uses a bladder cartridge, which includes a U-shaped bladder carried on a corresponding T-shaped retainer, and axial sealing components to axially compress the bladder to the retainer. The axial sealing components are axially fastened to the retainer or threaded to each other to compress axial sealing protuberances on the bladder under extremely high forces to prevent hydraulic fluid from escaping a radial fluid chamber between the bladder and the retainer. Although this approach results in somewhat lower fluid pressures, it requires many additional parts of precision manufacture.

A further recent solution includes use of a multi-piece bladder including a 70 durometer (Shore A scale hardness) plastic center section fused between 90 durometer (Shore D scale) plastic end sections. The multi-piece bladder has a wall thickness of about 0.250" to 0.500" for a corresponding 1" in outside diameter. The relatively hard end sections sealingly engage much softer 70 durometer (Shore A scale hardness) O-rings between the bladder and a main body in order to seal a fluid chamber therebetween. While this approach also results in lower fluid pressures, it too requires many additional parts of precision manufacture.

In summary, the art of workholding has used older high pressure workholders with steel or hard plastic bladders, or newer workholders employing more complex configurations such as high compression axial sealing arrangements or thick and hard multi-piece bladder materials.

SUMMARY OF THE INVENTION

A workholder to hold a workpiece according to one implementation includes a steel main body partially defining a hydraulic fluid chamber and including annular seal grooves axially adjacent the fluid chamber with annular seals, which are disposed therein to further define the fluid chamber and are composed of approximately 70 durometer Shore A scale hardness nitrile. A bladder is carried by the main body with an interference fit of approximately 0.001". The bladder further defines the fluid chamber, and is composed of approximately 90 durometer Shore A scale hardness cast polyurethane of approximately 15:1 diameter-to-wall-thickness ratio. A steel collet is carried and driven by the bladder for gripping engagement with the workpiece.

According to another implementation, a workholder to hold a workpiece includes a metal main body partially defining a fluid chamber, and a bladder carried by the main body with an interference fit from 0.0001" to 0.002". The bladder further defines the fluid chamber, and is composed of an approximately 85 to 95 durometer Shore A scale hardness polymer of approximately 12:1 to 18:1 diameter-to-wall-thickness ratio. Annular seals further define the fluid chamber, are disposed radially between the bladder and main body and axially adjacent the fluid chamber, and are composed of an approximately 65 to 75 durometer Shore A scale hardness polymer. A metal collet is carried and driven by the bladder for gripping engagement with the workpiece.

According to a further implementation, a workholder to hold a workpiece includes a main body partially defining a fluid chamber, and a bladder carried by the main body with an interference fit. The bladder further defines the fluid chamber, and is composed of an 80 to 100 durometer Shore A scale hardness polymer of a 12:1 to 18:1 diameter-to-wall-thickness ratio. Annular seals further define the fluid chamber, are disposed radially between the bladder and main body and axially adjacent the fluid chamber, and are composed of a 60 to 80 durometer Shore A scale hardness polymer. A collet is carried and driven by the bladder for gripping engagement with the workpiece.

At least some of the objects, features and advantages that may be achieved by at least certain embodiments of the invention include providing a workholder that may have a bladder that is highly displaceable under relatively low fluid pressure to firmly hold a workpiece received adjacent to a driven member, may provide equal or greater holding power under lower fluid pressures compared to prior art devices, may have a greater expansion or contraction range, may reduce or eliminate fluid leakage, may be used to firmly hold and locate workpieces formed of cast material, may conform to a workpiece which is out of round, may dampen vibrations during the machining process, may provide a better finish of the part machined, may repeatably and reliably hold and locate workpieces, may reliably center each workpiece, may be formed of different thicknesses to accommodate different sized parts, may be displaced generally radially inwardly or radially outwardly, and may be of relatively simple design, economical manufacture and assembly, rugged, durable, reliable, and in service may have a long useful life.

Of course, other objects, features and advantages will be apparent in view of this disclosure to those skilled in the art.

Various other workholders embodying the invention may achieve more or less than the noted objects, features or advantages.

BRIEF DESCRIPTION OF THE DRAWINGS

These and other objects, features and advantages of the present invention will be apparent from the following detailed description of preferred embodiments and best mode, appended claims, and accompanying drawings in which:

FIG. 2 is a partial sectional view of a presently preferred form of a fluid-actuated chuck.

DETAILED DESCRIPTION

Figure 1:
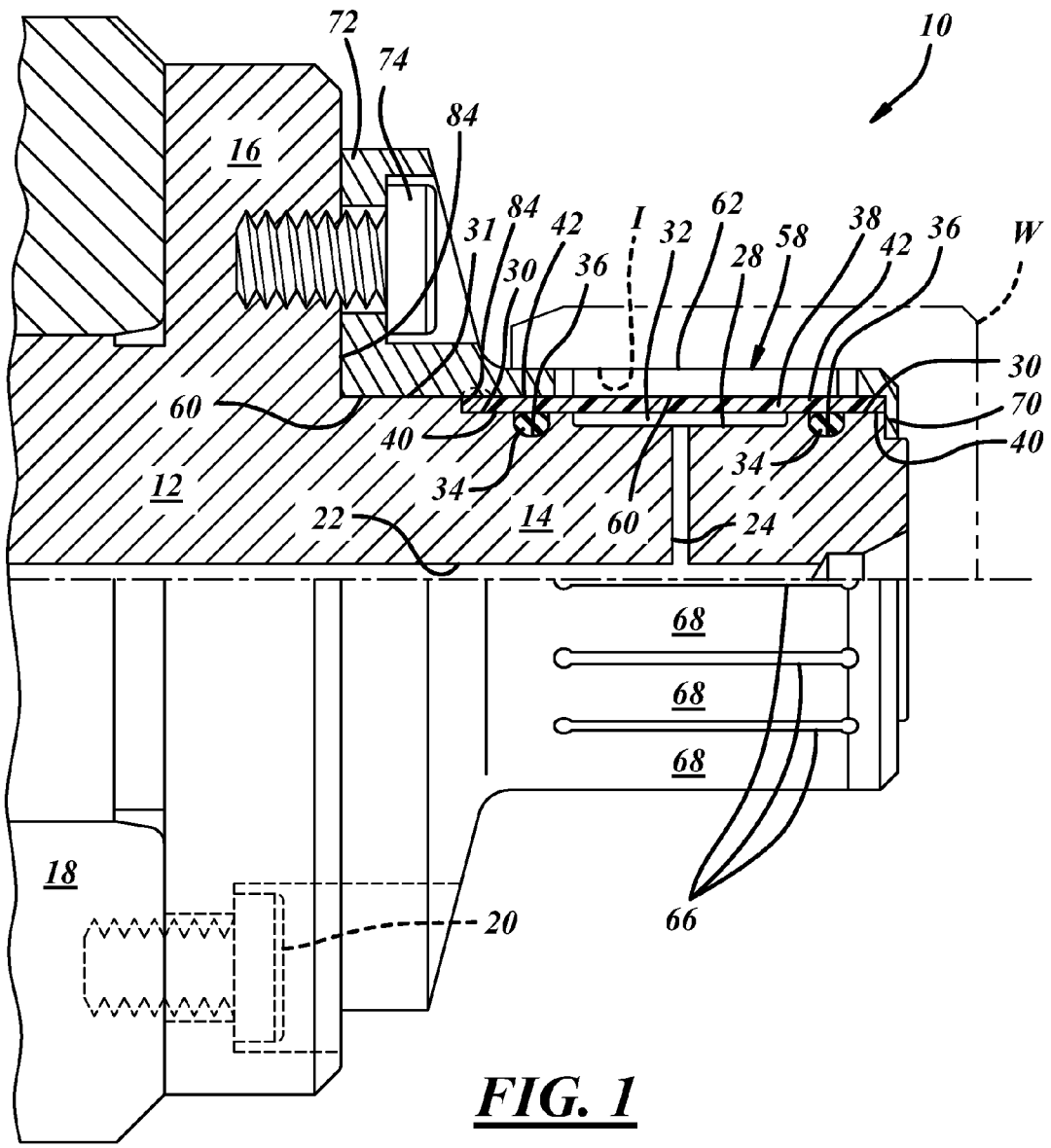
FIG. 1 is a partial sectional view of a presently preferred form of a fluid-actuated arbor.

Referring in detail to the drawings, FIG. 1 illustrates a hydrostatic workpiece holder, and more specifically, a hydrostatic arbor 10. The arbor 10 includes a main body 12 that may have a cylindrical shaft or mandrel portion 14 and a radially extending mounting flange portion 16. The body 12 may be constructed to be mounted on a machine tool spindle 18 by suitable cap screws 20 as shown. The body 12 may include a main fluid passage 22 and one or more branch fluid passages 24 that are constructed to be filled with a pressurized fluid. The main fluid passage 22 may be supplied with pressurized fluid from a pump carried by the body 12 or through the machine tool spindle 18 by a remote pump. Because such low pressures are required to activate the arbor 10, pressurized air, instead of oil, may be used. The mandrel portion 14 of the body 12 may include an external annular recess 28 in a first outer diameter or first outer surface 30 of the mandrel portion 14 to at least partially define a fluid chamber 32. The mandrel portion 14 may be stepped to include the first outer surface 30 and a larger, second outer diameter or outer surface 31. The body 12 may be composed of steel, brass, fiber reinforced polymeric material, or any other suitable material.

Also, the mandrel portion 14 may carry resilient polymeric seals 34, such as O-rings, which may be disposed within annular grooves 36 in the mandrel portion 14. The seals 34 may further define and seal the fluid chamber 32.

The arbor 10 also includes a circumferentially continuous sleeve or bladder 38 carried by or engaging the main body 12, for example, adjacent to and circumscribing at least part of the mandrel portion 14 of the body 12 to further define the fluid chamber 32. The bladder 38 includes an inner cylindrical surface 40 that cooperates with the first outer surface 30 of the mandrel portion 14 of the body 12 and further includes an oppositely disposed outer cylindrical surface 42.

The arbor 10 may further include a split sleeve, also known as a collet 58 carried by or engaging the bladder 38, for example, adjacent to and circumscribing the bladder 38, such that the collet 58 and bladder 38 are in a relatively lapped relationship. The collet 58 may include an inner surface 60 that engages the outer cylindrical surface 42 of the bladder 38 and the second outer surface 31 of the body 12. The collet 58 further may include an oppositely disposed outer surface 62 to engage a workpiece W. The collet 58 may be generally tubular or cylindrical and includes a plurality of circumferentially spaced and longitudinally extending through slots or displacement reliefs 66 formed therein such as by milling or electro-discharge machining. The reliefs 66 may be bounded by bearing sections 68 of the collet as shown, or may be formed into ends of the collet 58 as is well known in the art of collet design. The reliefs 66 sufficiently weaken the collet 58 for facilitating radial displacement of at least the bearing sections 68 of the collet 58. The collet 58 may include an outboard flange 70 for axial abutment with ends of the body mandrel portion 14 and/or the bladder 38. Also, the collet 58 may include an inboard flange 72 for axial abutment with the body flange portion 16, and may be fastened thereto by one or more fasteners 74. The collet 58 may be composed of a metal such as hardened SAE 4130 or any other suitable metal. Nevertheless, the collet 58 is composed of a material and constructed in a manner to permit outward radial displacement thereof.

In assembly, the polymeric rings 34 may be stretched over the mandrel portion 14 of the body 12 and positioned into the annular grooves 36, as shown in FIG. 1. The bladder 38 then may be telescoped or assembled coaxially over the end of the mandrel portion 14 in abutment with a first shoulder 82 of the mandrel portion 14 of the body 12 and in sealing engagement with the resilient polymeric rings 34 to compress the rings 34 and seal the fluid chamber 32. The collet 58 thereafter may be assembled over the bladder 38 in abutment with a second shoulder 84 of the mandrel portion 14 of the body 12. More specifically, the collet 58 may be sized relative to the bladder 38 for a diametric interference fit of approximately 0.0005". For example, the fit may include 0.0001" to 0.001" of diametric interference. Any other suitable fit may be used if so desired.

In use, the workpiece W is disposed over the outer surface 62 of the collet 58. The workpiece W may be a cast iron sleeve, a gear blank, or any other workpiece suitable for mounting on an arbor. To firmly hold the workpiece W on the arbor 10, fluid under pressure is provided from an external or internal source through the main fluid passage 22 and branch fluid passages 24 and into the fluid chamber 32. The force of the pressurized fluid radially outwardly displaces the resilient bladder 38, which firmly engages and radially outwardly displaces the collet 58 to urge the collet 58 into firm engagement with an inner surface I of the workpiece W to firmly hold and accurately locate the workpiece W for machining or other operations to be performed thereon. To remove the workpiece W after machining operations, the pressure of the fluid supplied to the fluid chamber 32 is decreased or relieved, thereby decreasing the pressure of the fluid in the fluid chamber 32 to thereby relax the bladder 38 and collet 58. Thus, the bladder 38 acts as a drive member to radially outwardly urge a driven member (collet 58) into engagement with the workpiece W.

FIG. 2 illustrates another presently preferred form of a workholder. This form is similar in many respects to the form of FIG. 1 and like numerals between the forms generally designate like or corresponding elements throughout the several views of the drawing figures. Accordingly, the description of the arbor 10 is incorporated into the following description by reference in its entirety. Additionally, the description of the common subject matter generally may not be repeated here.

FIG. 2 illustrates a hydrostatic workpiece holder, and more specifically, a hydrostatic chuck 110. The chuck 110 is similar to the arbor 10 embodiment of FIG. 1 in that it is basically a female version thereof. Accordingly, for brevity and clarity, some details in common between the two embodiments may be omitted from discussion of the chuck 110.

The chuck 110 includes a main body 112 that may have a cylindrical tube or socket portion 114 and a radially extending mounting flange portion 116. The body 112 may be constructed to be bolted to a machine tool spindle (not shown) for co-rotation therewith. The body 112 may include a main fluid passage 122 and branch fluid passages 124, 126 that are constructed to be filled with a pressurized fluid. As is well known in the art, the main fluid passage 122 may be supplied with pressurized fluid either by a pump carried by the body 112 or through the machine tool spindle (not shown) by a remote pump. The socket portion 114 may be stepped to include a first inner diameter or first inner cylindrical surface 130 and a smaller, second inner diameter or inner cylindrical surface 131. Also, the body 112 may include an internal annular recess 128 in the first inner surface 130 which may partially define a fluid chamber 132 that may sealed by polymeric seals 134, which may be disposed within annular grooves 136 in a sidewall of the socket portion 114.

A sleeve, diaphragm, or bladder 138 is carried by or engages the main body 112, for example, adjacent to and disposed within the first inner surface 130 of the socket portion 114 of the body 112 and may partially define the fluid chamber 132. The bladder 138 may include an outer cylindrical surface 140 that may cooperate with the first inner surface 130 of the mandrel portion 114 of the body 112 and further may include an oppositely disposed inner cylindrical surface 142.

A split sleeve or collet 158 may be carried by or engages the bladder 138, for example, adjacent to and disposed within the bladder 138. The collet 158 may include an outer surface 160 that engages the inner cylindrical surface 142 of the bladder 138 and the second inner surface 131 of the body 112. The collet 158 may further include an oppositely disposed inner surface 162. As described previously with respect to the first embodiment, the collet 158 may be generally tubular or cylindrical and includes a plurality of circumferentially spaced and longitudinally disposed slots or displacement reliefs 166 formed therein such as by milling or electro-discharge machining. The collet 158 may be composed of any suitable material, and may be constructed in a manner to permit inward radial displacement thereof. For example, the collet 158 may be composed of steel, at least for bearing sections 168.

An annular nose piece 176 may cap the socket portion 114 of the body 112 and a retainer ring 180 may be disposed between nose piece 176 and the bladder 138 and/or collet 158. Cap screws 178 may be threaded into the end of the socket portion 114 of the body 112 to hold the nose piece 176 thereto.

In assembly, the resilient polymeric seals 134 may be received in the annular the annular grooves 136 of the socket portion 114 of the body 112. The bladder 138 then may be inserted coaxially within the first inner surface 130 of the socket portion 114 under an interference fit, in abutment with a first shoulder 182 of the body 112, and in sealing engagement with the polymeric seals 134 to seal the fluid chamber 132. The seals 134 may be slightly radially compressed between the bladder 138 and the socket portion 114. The collet 158 thereafter may be assembled within the bladder 138, the first inner surface 130 of the socket portion 114, and the second inner surface 131 of the socket portion 114 in abutment with a second shoulder 184 of the body 112. Finally, the nose piece 176 may be assembled over the end of the socket portion 114 of the body 112. The cap screws 178 then may be threaded through the end of the nose piece 176 and into the end of the socket portion 114 to secure the assembly together.

In use, the workpiece W' may be disposed within the collet 158 until the workpiece W' engages the second shoulder 184 of the body 112. The workpiece W' may be a cast iron sleeve, or any other workpiece suitable for mounting in a chuck. To firmly hold the workpiece W' in the chuck 110, fluid under pressure may be provided from an internal or external source through the main fluid passage 122 and branch fluid passages 124, 126 and into the fluid chamber 132. The force of the pressurized fluid radially inwardly displaces the bladder 138 which firmly engages and radially inwardly displaces the collet 158 to urge the collet 158 into firm engagement with an outer surface O of the workpiece W' to firmly hold and accurately locate the workpiece W' for machining or other operations to be performed thereon. To remove the workpiece W' after machining operations, the pressure of the fluid supplied to the chuck 110 may be decreased or relieved, thereby decreasing the pressure of the fluid in the fluid chamber 132 to thereby relax the bladder 138 and the collet 158. Thus, the bladder 138 acts as a drive member to radially outwardly urge a driven member (collet 158) into engagement with the workpiece W.

The workholders 10, 110 are constructed and composed in accordance with a confluence of parameters for an improved level of performance, heretofore unexpected in the art. More specifically, one or more of the following parameters are believed to have produced the surprising results described in greater detail below: the relationship of the diameters and wall thicknesses of the bladders 38, 138, the fit of the bladders 38, 138 to the main bodies 12, 112, or the soft material composition of the bladders 38, 138.

The bladders 38, 138 may have a wall thickness of approximately 0.07" (inches) for a corresponding diameter of approximately 1", and the wall thickness may be increased by approximately 0.04" for each additional 1" of corresponding increase in bladder diameter. For example, the wall thickness may be 0.06" to 0.08" for about 1" in bladder diameter and may be 0.1" to 0.12" for about 2" in bladder diameter and so on. In other words, the bladders 38, 138 may have a diameter-to-wall-thickness ratio of approximately 15:1. For example, the ratio may be in a range from about 12:1 to 18:1.

Also, the bladders 38, 138 may be sized relative to the mandrel or socket portions 14, 114 for an interference fit of approximately 0.0015". For example, the fit may include about 0.001" to 0.002" of interference. Such fits are in stark contrast to prior art workholders, wherein hard plastic bladders like Delrin® bladders are sized relative to a workholder main body for a diametric clearance fit of approximately 0.00075", for example from 0.0005" to 0.001".

The bladders 38, 138 may be manufactured in any suitable manner, for example, cast from a relatively soft polymeric material or polymer compared to much harder prior art bladders. The bladders 38, 138 may have a hardness on the Shore A scale hardness scale of approximately 90 durometer. For example, the hardness may be about 80 to 100 durometer Shore A scale hardness. In a more particular example, the hardness may be about 85 to 95 durometer Shore A scale hardness. An exemplary material may include cast polyurethane, for example, CURENE brand polyurethane available from Anderson Development Company of Adrian, Mich. or cast polyurethane available from DuPont of Canada.

The seals 34, 134 may be manufactured in any suitable manner, for example, cast from an even softer polymeric or elastomeric material than the bladders 38, 138. The seals 34, 134 may have a hardness on the Shore A scale hardness scale of approximately 70 durometer. For example, the hardness may be about 60 to 80 durometer Shore A scale hardness. In a more particular example, the hardness may be about 65 to 75 durometer Shore A scale hardness. In any event, the seals 34, 134 may have a hardness on the Shore A scale hardness scale of approximately 20 durometer less than that of the bladders 38, 138.

Hardness of polymers or elastomers is a standard material measurement that may be performed using durometer hardness test procedures well known to those of ordinary skill in the art. For example, ASTM D2240 procedure is available from ASTM International of West Conshohocken, Pa., and ISO 868 procedure is available from the International Organization for Standardization of Geneva, Switzerland. Such procedures may be used for determining indentation hardness of various substances, by measuring the depression force of a specific type of indenter as it is forced under specific conditions against a surface of the material. Typically, a steel rod indenter is forced by a calibrated spring at a controlled rate against the material surface and a reading is recorded within a specified time period. This procedure may be repeated multiple times at different positions on the specimen and the arithmetic mean of the results may be used to yield a final measurement.

Because of various parameters that influence hardness determinations, different durometer scales have been established, such as Shore A scale hardness for softer plastics and Shore D scale for harder plastics. The scales are typically reported in a range of dimensionless units from 0 to 100, wherein a reading of 0 is reported if the indenter completely penetrates the sample material, and a reading of 100 is reported if no penetration occurs. Because of the differences in geometry of the indenter used and calibrated spring forces that influence the measurements, no reliable relationship exists between the measurements obtained between the Shore A scale hardness and Shore D scale scales. For example, the test for Shore D scale, which is designed for harder materials, is distinct from Shore A scale hardness in that the Shore D scale indenter is shaped with a pointed tip and the calibrated spring force is a greater force than that used in the Shore A scale. Generally, this test is not suitable for materials which are measured on a Shore A scale hardness scale. For example, a hard plastic such as Delrin® having Shore D scale hardness of about 83 durometer is substantially different than the relatively soft 80 to 100 durometer Shore A scale hardness materials disclosed herein.

As used herein, the phrase polymeric material(s) generally includes relatively high-molecular-weight materials of either synthetic or natural origin and may include thermosets, thermoplastics, and elastomers. The term elastomeric generally means a material, which at room temperature, may be stretched under low stress, for example, to about twice its original length or more and, upon release of the stress, may return with force to its approximate original length. Elastomeric also encompasses any of various elastic substances resembling rubber, such as a fluorocarbon like Viton®, a nitrile such as acrylonitrile-butadiene, or any other suitable elastomer.

Compared to prior art bladder materials, the presently disclosed material requires far less pressure to radially outwardly expand or inwardly contract the bladders 38, 138 between the seals 34, 134 into suitable holding or gripping engagement of the workpieces W, W', for example, during machining of the workpieces W, W'. More specifically, prior art workholders with steel collets over Delrin® bladders require 2,800 PSI for an approximately 1" diameter bladder, whereas the present workholders 10, 110 use less than 1,600 PSI for the same collet to achieve the same holding force on the order of about 40 ft-lbs of torque. Yet, unexpectedly, the presently disclosed material assists in maintaining surface contact between the bladders 38, 138 and the polymeric rings 34, 134 for good sealing with little to no extrusion through the collets 58, 158.

To evaluate the improvement of the performance and properties that can be obtained in accordance with the technical teachings herein, several specimens were fabricated for testing.

Table 1 illustrates test results from a one inch conventional workholder having a Delrin® bladder and no collet. Support rings were placed over the bladder at an axial location coinciding with the underlying seals. The first column represents the fluid pressure applied, the second column represents the diameter of the bladder in inches at the respective fluid pressure, and the third column represents the change in diametric size in inches from one pressure increment to the next.

TABLE 1

| PSI | SIZE | DELTA |
|---|---|---|
| 0 | 0.936 | |
| 50 | 0.937 | 0.001 |
| 100 | 0.938 | 0.002 |
| 200 | 0.94 | 0.004 |
| 300 | 0.9415 | 0.0055 |
| 400 | 0.947 | 0.011 |
| 500 | 0.9495 | 0.0135 |
| 600 | 0.956 | 0.02 |
| 700 | 0.959 | 0.023 |
| 800 | 0.969 | 0.033 |

Table 2 illustrates test results from a one inch workholder having a 90 durometer Shore A scale hardness bladder and 70 durometer Shore A scale hardness seals according to the present disclosure and no collet. Nearly identical results were achieved with an 80 durometer Shore A scale hardness bladder and 60 durometer Shore A scale hardness seals. Support rings were placed over the bladder at an axial location coinciding with the underlying seals. The column descriptions are the same as for Table 1.

TABLE 2

| PSI | SIZE | DELTA |
|---|---|---|
| 0 | 0.954 | |
| 1 | 0.976 | 0.02 |
| 10 | 1 | 0.046 |

In contrasting the data of Tables 1 and 2, one of ordinary skill in the art will recognize that a conventional workholder requires 600 PSI to displace the conventional bladder 0.020" in diameter, whereas the workholder of the present disclosure requires a mere one PSI to do the same.

Table 3 illustrates test results from a one inch conventional workholder having a Delrin® bladder and a collet disposed over the bladder.

TABLE 3

| PSI | SIZE | DELTA |
|---|---|---|
| 0 | 1.067 | |
| 200 | 1.068 | 0.001 |
| 300 | 1.069 | 0.002 |
| 400 | 1.0695 | 0.0025 |
| 500 | 1.071 | 0.004 |
| 600 | 1.0715 | 0.0045 |
| 700 | 1.072 | 0.005 |
| 800 | 1.0735 | 0.0065 |
| 900 | 1.0745 | 0.0075 |
| 1000 | 1.0755 | 0.0085 |
| 1100 | 1.077 | 0.01 |
| 1200 | 1.078 | 0.011 |
| 1300 | 1.079 | 0.012 |
| 1400 | 1.08 | 0.013 |
| 1500 | 1.081 | 0.0014 |
| 1600 | 1.082 | 0.0015 |
| 1700 | 1.083 | 0.0016 |
| 1800 | 1.084 | 0.0017 |
| 1900 | 1.0855 | 0.0185 |
| 2000 | 1.087 | 0.02 |

Table 4 illustrates test results from a one inch workholder having a 90 durometer Shore A scale hardness bladder and 70 durometer Shore A scale hardness seals according to the present disclosure and a collet. Nearly identical results were achieved with an 80 durometer Shore A scale hardness bladder and 60 durometer Shore A scale hardness seals and the collet.

TABLE 4

| PSI | SIZE | DELTA |
| --- | --- | --- |
| 0 | 1.066 | |
| 100 | 1.069 | 0.003 |
| 200 | 1.071 | 0.005 |
| 300 | 1.072 | 0.006 |
| 400 | 1.075 | 0.009 |
| 500 | 1.077 | 0.011 |
| 600 | 1.0795 | 0.0135 |
| 700 | 1.082 | 0.016 |
| 800 | 1.084 | 0.018 |
| 900 | 1.086 | 0.02 |
| 1000 | 1.089 | 0.023 |
| 1100 | 1.091 | 0.025 |

In contrasting the data of Tables 3 and 4, one of ordinary skill in the art will recognize that a conventional workholder requires 700 PSI to displace the conventional collet 0.005" in diameter, whereas the workholder of the present disclosure requires a mere 200 PSI to do the same. Similarly, the conventional workholder requires 2,000 PSI to displace the conventional collet 0.020" in diameter, whereas the workholder of the present disclosure requires a mere 900 PSI to do the same.

Table 5 illustrates holding power test results using the conventional workholder including the collet. The first column represents the fluid pressure applied, and the second column represents the maximum rotational holding force on a workpiece at that pressure before the workpiece slips relative to the workholder.

TABLE 5

| PSI | TORQUE |
| --- | --- |
| 2000 | 15 FTLBS |
| 2600 | 36.5 FTLBS |

Table 6 illustrates holding power test results using the presently disclosed workholder and its collet.

TABLE 6

| PSI | TORQUE |
| --- | --- |
| 1200 | 25 FTLBS |

In contrasting the data from Tables 5 and 6, one of ordinary skill in the art will recognize that the presently disclosed workholder is capable of providing a workpiece holding force equivalent to 25 foot-pounds of torque at only 1,200 PSI, whereas the conventional workholder requires about twice the fluid pressure to achieve similar holding force.

The tests were conducted with an actual workpiece and were cycled over 150,000 times. No leakage occurred with the conventional or the presently disclosed workholder. But the conventional bladders exhibited witness marks where portions had extruded through slots in the collet. In contrast, the bladders of the presently disclose workholder had no such witness marks and no other types of visible wear.

Thus, an artisan of ordinary skill will recognize that the presently disclosed workholder requires less fluid pressure to operate, provides relatively higher workpiece holding forces, and is less susceptible to wear.

These results are unexpected because artisans of ordinary skill would expect such soft and thin bladder material to easily extrude through and/or tear on slots of a collet and perhaps burst like a balloon therethrough. In other words, those of ordinary skill in the art would consider such soft and thin material far too pliable and weak and therefore incapable of resisting overexpansion or rupture. Moreover, the results of the interference fit between the bladders 38, 138 and main bodies 12, 112 was surprising, because it tends to thin the walls of the already relatively thin-walled bladders 38, 138. Thus, artisans of ordinary skill would undoubtedly avoid such a maneuver for fear of further weakening the bladders 38, 138.

The satisfactory, if not improved, sealing between the soft bladders 38, 138 and soft seals 34, 134 is also unexpected because use of highly soft materials for mutual, corresponding sealing surfaces would be considered vulnerable to seal "blow by" and therefore incapable of providing adequate sealing. In other words, the presently disclosed workholders achieved as good or better holding and sealing performance compared to the prior art with a relatively small differential in hardness between the bladders 38, 138 and seals 34, 134. Such a small differential would have been routinely overlooked by artisans of ordinary skill who have long been believed it necessary to employ large hardness differentials across different hardness scales, such as 80 durometer Shore D scale Delrin® against 75 durometer Shore A scale hardness Viton®. In other words, artisans seek to apply large differentials in durometer between sealing materials.

Because the prior art has recognized neither the particular relationships of materials and components disclosed herein, nor their attendant advantages, traditional prior art workholders have long used significantly harder and/or thicker materials and components that involve higher fluid pressures and concomitant issues to achieve good sealing and gripping. Typically, prior art bladders are injection molded or machined from solid material and composed of materials having 70 to 90 durometer Shore D scale hardness such as Delrin®, and Nylon®, and some of the harder Shore D scale polyurethanes.

Accordingly, the aforementioned issues would discourage artisans of ordinary skill from even attempting the combination of new and nonobvious features disclosed herein.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

What is claimed is:

1. A hydrostatic workholder to hold a workpiece, comprising:

a steel main body partially defining a hydraulic fluid chamber and including annular seal grooves axially adjacent the fluid chamber with annular seals, which are disposed therein to further define the fluid chamber and are composed of approximately 70 durometer Shore A scale hardness nitrile;

a one-piece homogenously integral and circumferentially continuous annular bladder carried by the main body with an interference fit of approximately 0.001", further defining the fluid chamber, composed of approximately 90 durometer Shore A scale hardness polyurethane and having approximately a 15:1 diameter-to-wall-thickness ratio;

a steel collet having a plurality of generally longitudinally extending and circumferentially spaced-apart through slots carried by the main body and directly engageable with and generally radially displaceable by the bladder for gripping direct engagement with the workpiece; and excluding any metal baffle between the bladder and the collet.

2. The workholder of claim 1, wherein the workholder is an arbor.

3. The workholder of claim 1, wherein the workholder is a chuck.

4. A workholder to hold a workpiece, comprising:

a metal main body partially defining a fluid chamber;

a one-piece homogenously integral and circumferentially continuous bladder carried by the main body with an interference fit from 0.001" to 0.002", further defining the fluid chamber, composed of an approximately 85 to 95 durometer Shore A scale hardness polymer and having approximately a 12:1 to 18:1 diameter-to-wall-thickness ratio;

annular seals further defining the fluid chamber, disposed radially between the bladder and main body and axially adjacent the fluid chamber, and composed of an approximately 65 to 75 durometer Shore A scale hardness polymer; and a metal collet having a plurality of circumferentially spaced-apart through slots, carried by the main body and engaged with and generally radially displaceable by the bladder for gripping direct engagement with the workpiece.

5. The workholder of claim 4, wherein the workholder is an arbor.

6. The workholder of claim 4 wherein the workholder is a chuck.

7. The workholder of claim 4, wherein the bladder is composed of a cast polyurethane.

8. The workholder of claim 4, wherein the annular seals are composed of a nitrile material.

9. A workholder to hold a workpiece, comprising:

a main body partially defining a fluid chamber;

a one-piece homogenously integral and circumferentially continuous annular bladder carried by the main body with an interference fit, further defining the fluid chamber, composed of an 80 to 100 durometer Shore A scale hardness polymer and having a 12:1 to 18:1 diameter-to-wall-thickness ratio;

annular seals further defining the fluid chamber, disposed radially between the bladder and main body and axially adjacent the fluid chamber, and composed of a 60 to 80 durometer Shore A scale hardness polymer; and a collet having a plurality of circumferentially spaced-apart through slots, carried by the main body and engaged with and generally radially displaceable by the bladder for gripping direct engagement with the workpiece.

10. The workholder of claim 9 wherein the workholder is an arbor.

11. The workholder of claim 9 wherein the workholder is a chuck.

12. The workholder of claim 9 wherein the bladder is composed of a cast polyurethane.

13. The workholder of claim 9, wherein the annular seals are composed of a nitrile material.

14. The workholder of claim 9, wherein the bladder is composed of an approximately 85 to 95 durometer Shore A scale hardness polymer.

15. The workholder of claim 14, wherein the bladder is composed of a polymer having a hardness of about 90 durometer Shore A scale hardness.

16. The workholder of claim 9, wherein the bladder is composed of an approximately 80 to 90 durometer Shore A scale hardness polymer.

17. The workholder of claim 9, wherein the bladder includes an approximately 15:1 diameter-to-wall-thickness ratio.

18. The workholder of claim 9 wherein the annular seals are composed of an approximately 70 durometer Shore A scale hardness polymer.

19. The workholder of claim 9 excluding any baffle between the bladder and the collet.

20. The workholder of claim 19 wherein the collet has a plurality of circumferentially spaced apart and longitudinally extending through slots.

* * * * *